Feb. 10, 1959     E. P. NEY ET AL     2,872,808
TENSION COMPONENT MEASURING MEANS
Filed Oct. 6, 1955     2 Sheets-Sheet 1
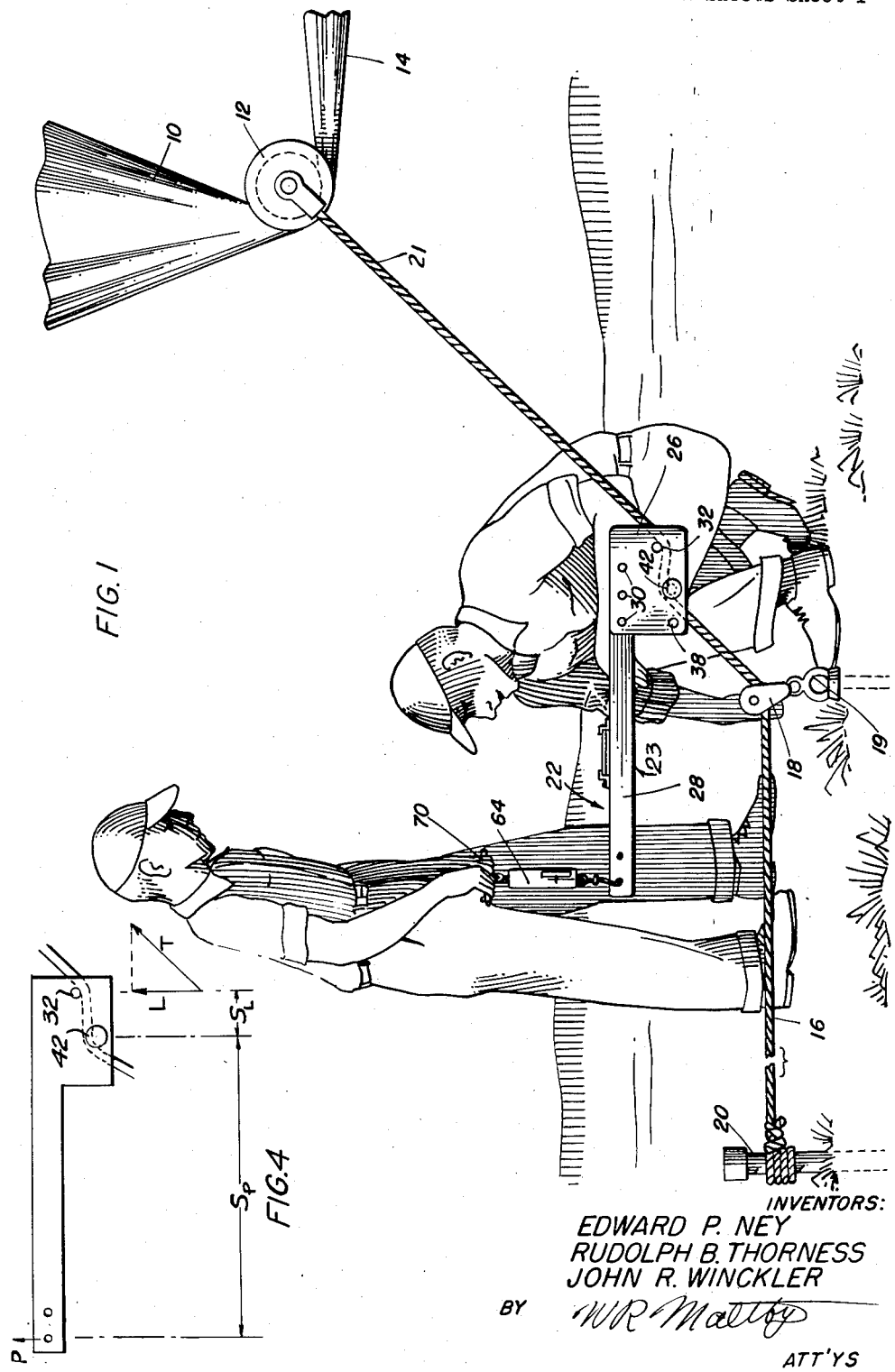
INVENTORS:
EDWARD P. NEY
RUDOLPH B. THORNESS
JOHN R. WINCKLER
BY
ATT'YS

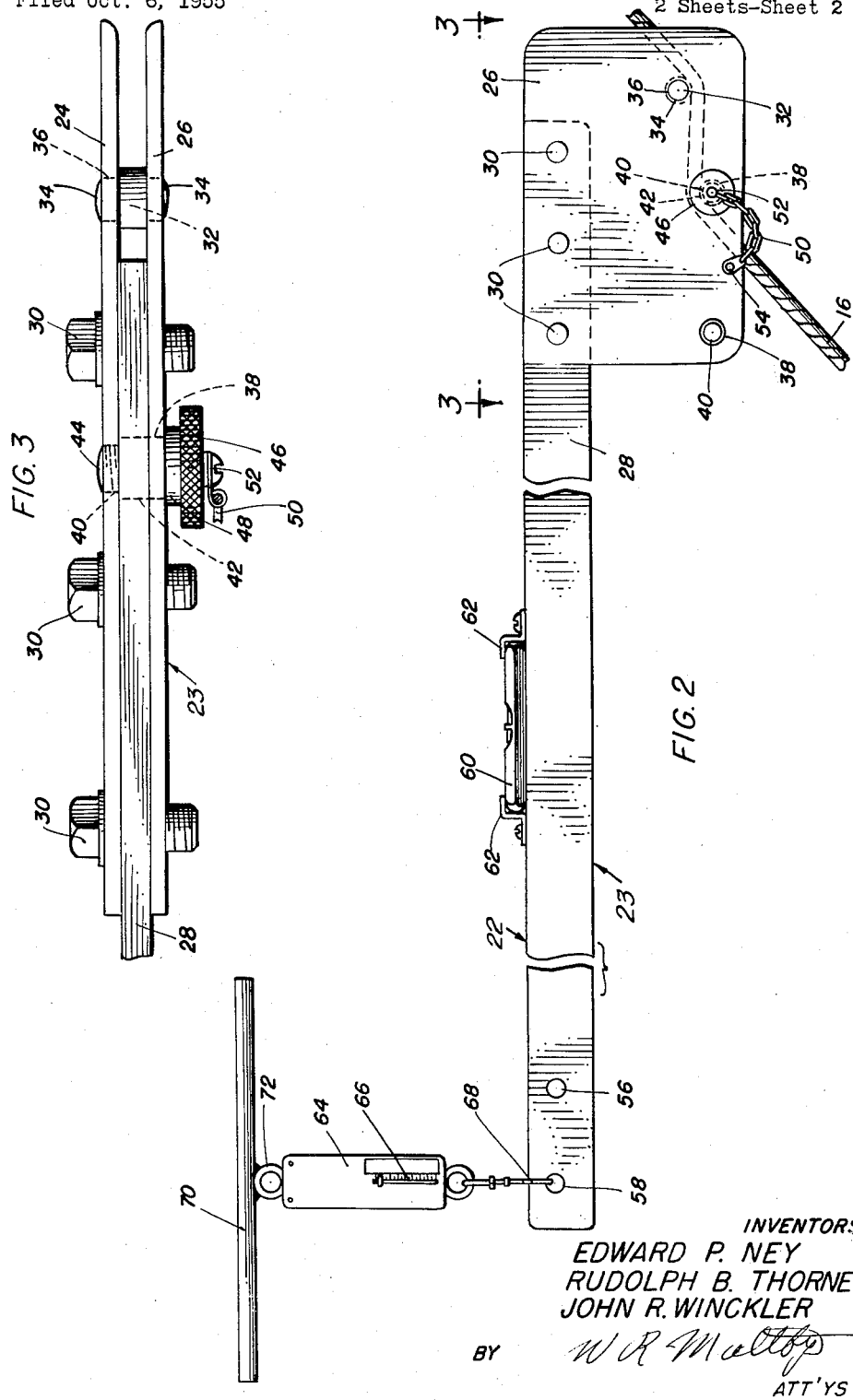

United States Patent Office 2,872,808
Patented Feb. 10, 1959

2,872,808

TENSION COMPONENT MEASURING MEANS

Edward P. Ney and Rudolph B. Thorness, Minneapolis, and John R. Winckler, St. Paul, Minn., assignors, by mesne assignments, to the United States of America as represented by the Secretary of the Navy Application October 6, 1955, Serial No. 539,039

12 Claims. (Cl. 73—144)

This invention relates to means for use in determining the vertical component of the tension in a line and more particularly the lift of a balloon while the balloon is held or tied to the ground.

In launching a balloon, it is particularly desirable to determine the lifting power of the balloon at different conditions of its inflation.

An important object of the invention is to provide means adapted to be operatively connected with a balloon-tethering guy line for determining the balloon lift.

A further object of the invention is to provide a simple mechanism for determining the vertical component of the tension in a line.

A still further object of the invention is to provide simple means for measuring the lift of a balloon while it is connected to the ground.

A still further object of the invention is to provide a torque device engageable with a guy line and adjustable to provide different scale factors for calculating the vertical component of the tension in the line.

Still a further object of the invention is to provide a torque device which may be easily applied to any inclined holding line which is in tension, the device having means by which the vertical component of the tension in the line may be determined.

Other objects of the invention will appear in the specification and will be apparent from the accompanying drawings in which:

Fig. 1 shows a torque or lever mechanism in accordance with this invention as connected in a tension line tethering a balloon to the ground;

Fig. 2 shows the same mechanism on a larger scale;

Fig. 3 is an enlarged view of a portion of the lever as taken on the line 3—3 of Fig. 2; and Fig. 4 is a schematic view of the lever.

In launching a balloon, it is particularly desirable to determine the lift which is given to the balloon by any particular inflation in order to determine the ceiling altitude of the balloon and also to determine the approximate load which may be carried to a predetermined ceiling.

The present invention provides means for determining the lift, prior to launching, of a balloon at any degree of inflation by determining the vertical component of the tension in the balloon guy line irrespective of the inclination of the line.

Referring now more particularly to the drawings, a balloon 10 is represented with a partially inflated upper portion whose lower extremity passes under a holding roller 12, and with the lower portion 14 of the balloon gathered and extending substantially in a horizontal path to a fixed position at the end thereof where it is held for release and further inflation if desired.

To the holding roller 12 is connected a tension line 16 which passes through a pulley 18, secured by a metal stake 19 driven into the ground, and the extremity of the line is secured to a post 20 also driven into the ground, so that a portion of the line at 21 is inclined to the vertical.

In accordance with this invention there is provided a measuring mechanism 22 including a lever 23 connected and adapted to be held and moved in a floating relation on the inclined portion 21 of the tension line 16. The lever 23 comprises a pair of metal plates 24 and 26 which are spaced apart by a flat metal bar 28 secured to the plates by bolts 30 or other suitable fastening means.

Spaced from the bar 28 is a guide means such as a pin 32 having an intermediate portion between the plates 24 and 26 and reduced ends 34 seated in holes 36 in the plates. The pin 32 may rotate between the plates 24 and 26, or it may be nonrotatable as no great amount of movement of the line 16 is intended about the pin.

Spaced from the bar 28 and the pin 32 are unthreaded holes 38 in the plate 26 and respectively alined threaded holes 40 in the opposite plate 24. Each pair of alined holes 38 and 40 is selectively adapted to receive a guide means such as a pin 42 whose shank passes freely through the hole 38 and between the plates 24 and 26 and terminates in a reduced threaded stem 44 to fit the corresponding threaded hole 40. At the other end of the pin 42 is a knurled head 46, and between it and the adjacent plate 26 is a shoulder portion 48 which engages the outside of the plate 26 to bind the plates 24 and 26 together, the distance between the pins 32 and 42 depending upon the location of the pin 42 in one or the other set of the holes 38 and 40.

In order to anchor the pin 42 against loss, a short chain 50 is connected at one end by a screw 52 to the outside of the pin and is connected by a screw 54 to the outer side of the plate 26 between adjacent pivot holes 38.

In order to engage a tension line 16 with the pins 32 and 42 between the plates 24 and 26, the removable pin 42 being first removed from all of the holes 38 and 40, the lever 23 is placed over the inclined tension line portion 21 so that the line engages the pin 32, the lever is held so that the selected set of holes 38 and 40 is above a lower part of said line portion and the latter is between the plates, the pin 42 is inserted in that set of holes, and the lever is swung against the resistance of the line to angularly offset or kink said line portion between the pins 42 and 32 (Figs. 1 and 2) as indicated at 55.

The bar 28 extends beyond the plates 24 and 26 a distance of several times the length of the plates, depending upon the leverage desired, and is provided at its outer end portion with holes 56 and 58 variably spaced lengthwise of the bar. Connected to the upper edge of the bar 28 intermediate its length is a liquid level 60 which may be secured at its ends to the bar by fastening clips 62.

A spring scale 64 having scale graduations 66 is connected by means of a hook 68 within one of the holes 56 and 58, and at the top of the scale a cross bar 70 is connected to a pull ring 72 so that both hands of an operator, as shown in Fig. 1, may be applied in lifting the bar 28 when desired.

In the form of the invention illustrated, the bar 28 extends substantially parallel to the kinked or offset part 55 of the tension line portion 21, so that when the level 60 indicates that the bar is horizontal, it also indicates that the kinked or offset part is substantially horizontal.

In using the apparatus, any intermediate part of the tension line portion 21 is engaged by the lever pins 32 and 42 in the manner noted above, and a pull is applied to the cross bar 70 until the level 60 shows that the line part 55 is offset substantially horizontally in the vertical plane of said line portion. With the parts thus arranged as shown in Figs. 1, 2, and 4, and referring more particularly to Fig. 4, it is apparent that, regarding the pin 42 as the fulcrum of the lever 23, T represents the tension in the line portion 21, L represents the vertical component of the tension and hence the balloon lift producing that tension, $S_L$ represents the torque arm at which said vertical component may be said to act on the pin 32 to turn the lever counter-clockwise about the fulcrum, and P represents the vertical pull as measured by the scale 64, acting at a torque arm $S_P$ to turn the lever clockwise about the fulcrum and maintain the lever in equilibrium in the position shown. It is accordingly apparent that $$L \times S_L = P \times S_P$$

and therefore $$L = P\left(\frac{S_P}{S_L}\right)$$

Inasmuch as $$\left(\frac{S_P}{S_L}\right)$$

is a known constant of the lever when the line part 55 is substantially horizontal, and the value of P is shown by the scale 64, the value of the balloon lift L can be immediately calculated.

For different positions of the pin 42 and of the scale 64, the corresponding lever constant will of course be used.

It will be observed that with this device there is no necessity for determining the angle of inclination of the tension line portion 21.

When it is desired to disconnect the tension line portion 21 from the lever 23, the removable pin 42 is disengaged by threading it outwardly from the plate 24 which releases the tension line at the bottoms of the plates 24 and 26.

While a preferred embodiment has been described in some detail, it should be regarded as an example or embodiment of the invention and not as a restriction or limitation therein as many changes may be made in the construction and arrangement of the parts without departing from the spirit and scope of the invention.

We claim:

1. In a mechanism of the character described, a lever comprising a pair of plates, a bar fixed to and between and extending beyond said plate, a pair of members between which a tensioned line may extend between said plates, said members being secured by and extending between said plates and being so positioned that upon swinging of said lever pursuant to a pull thereon said members contact the line to produce an offset in the line, and pull-measuring means engaged with the outer end of said bar for measuring said pull.

2. In a mechanism of the character described, a lever comprising a pair of plates, a bar fixed to and between and extending beyond said plates, a pair of members between which a tensioned line may extend between said plates, one of said members being journaled in said plates, the other member being removably secured by and extending between said plates, said members being so positioned that upon swinging of said lever pursuant to a pull thereon said members contact the line to produce an offset in the line, and pull-measuring means engaged with the outer end of said bar for measuring said pull.

3. In a mechanism of the character described, a lever comprising a pair of plates, a bar fixed to and between and extending beyond said plates, a pair of members between which a tensioned line may extend between said plates, said members being secured by and extending between said plates and being so positioned that upon swinging of said lever pursuant to a pull thereon said members contact the line to produce an offset in the line, and pull-measuring means engaged with the outer end of said bar for measuring said pull, one of said members being fixed, the other member being threaded at one end and having a knob at its other end, one of said plates having threaded openings whose axes are at different distances from the first member, the other plate having openings respectively coaxial with said threaded openings, each set of coaxial openings being adapted to selectively receive said other member, whereby the distance between said members may be varied.

4. In combination with a balloon having an inflated upper portion and a gathered uninflated lower portion tethered at its lower end and extending laterally from said upper portion, a roller over and engaging said balloon at the juncture of said portions, a line tethering said upper portion and connected at its lower end to the ground and at its upper end to said roller with said lower portion extending substantially horizontally from said juncture, the portion of said line extending from said roller being inclined to the vertical, so that the vertical component of the tension in said line portion is equal to the lift of said upper balloon portion, means for determining said vertical component, said means comprising a lever having spaced parts adapted to be positioned respectively over and under an intermediate part of said line portion, means enabling turning force to be applied to said lever in a direction to cause said lever parts to kink said line portion until said intermediate part extends substantially horizontal in the vertical plane of said line portion, and means for measuring said force when said intermediate part so extends, the ratio of the respective torque arms of said force and component about one of said lever parts as a fulcrum when said intermediate part is substantially horizontal in said plane being predetermined, whereby said vertical component may be readily determined as substantially the product of the measured force and said ratio.

5. In combination with a balloon having an inflated upper portion and a gathered lower portion tethered at its lower end and extending laterally from said upper portion, a roller over and engaging said balloon at the juncture of said portions, a line tethering said upper portion and connected at its lower end to the ground and at its upper end to said roller with said lower portion extending substantially horizontally from said juncture, the portion of said line extending from said roller being inclined to the vertical, so that the vertical component of the tension in said line portion is equal to the lift of said upper balloon portion, means for determining said vertical component, said means comprising a lever having spaced parts adapted to be positioned respectively over and under an intermediate part of said line portion, means enabling turning force to be applied to said lever in a direction to cause said lever parts to kink said line portion until said line part extends substantially horizontal in the vertical plane of said line portion, means for indicating that said line part extends substantially horizontal, the ratio of the respective torque arms of said force and component about one of said lever parts as a fulcrum when said line part is substantially horizontal in said plane being predetermined, and means for measuring said force when said line part so extends, whereby said vertical component may be readily determined as substantially the product of the measured force and said ratio.

6. In combination with a balloon having an inflated upper portion and a gathered lower portion tethered at its lower end and extending laterally from said upper portion, a roller over and engaging said balloon at the juncture of said portions, a line tethering said upper portion and connected at its lower end to the ground and at its upper end to said roller with said lower portion extending substantially horizontally from said juncture, the portion of said line extending from said roller being inclined to the vertical, so that the vertical component of the tension in said line portion is equal to the lift of said upper balloon portion, means for determining said vertical component, said means comprising a lever having spaced parts adapted to be positioned respectively over and under an intermediate part of said line portion, means enabling turning force to be applied to said lever in a direction to cause said lever parts to kink said line portion until said line part extends substantially horizontal in the vertical plane of said line portion, a level carried entirely by said lever for indicating that said line part extends substantially horizontal, and means connected to said lever for measuring said force when said line part so extends, the ratio of the torque arm of said force to the torque arm of said component about one of said lever parts as a fulcrum when said line part is substantially horizontal in said plane being predetermined, whereby said component may be readily determined as substantially the product of the measured force and said ratio.

7. In a mechanism for use with a mooring line connected at its upper end to a roller extending over the juncture of the inflated upper part of a balloon and the substantially horizontally tethered uninflated gathered lower part of the balloon, for determining the lift of the inflated part, a lever having at one end a pair of mutually facing plates, a bar secured to and between and spacing said plates from each other, a pair of pins extending between and secured to said plates, said bar having a free outer end portion substantially farther from said pins than said pins are from each other, a spring balance comprising a part detachably connected to said outer end portion and a relatively movable second part having a handle, one of said parts having a scale and the other part having a cooperating pointer to measure the magnitude of a pull applied to said handle when the first part is restrained, one of said pins being movable to enable said lever to be applied to the mooring line with one pin over and the other pin under the line so that said handle may be pulled manually in a direction such as to cause said pins to kink the line in the vertical plane of the line and lower the inflated part of the balloon until the portion of the line between said pins is substantially horizontal, said pins being sufficiently close together so that the lowering of the inflated part of the balloon due to such kinking does not materially alter the substantially horizontal location of the adjacent uninflated part of the balloon, and means carried by said lever for indicating that said portion of the line is substantially horizontal, the torque arm of said pull being substantially greater than the torque arm of said line about one of said pins as a fulcrum, and the ratio of the respective torque arms being predetermined, whereby, when said portion of the line is substantially horizontal, the lift of the inflated part of the balloon may be computed as substantially the product of the magnitude of the corresponding pull on said handle and said ratio.

8. In a mechanism for use with a mooring line connected at its upper end to a roller extending over the juncture of the inflated upper part of a balloon and the substantially horizontally tethered uninflated gathered lower part of the balloon, for determining the lift of the inflated part, a lever having a pair of mutually facing plates, a pair of pins extending between and secured to said plates, a spring balance comprising a part detachably connected to said lever remote from said pins and a relatively movable part having a handle, one of said parts having a scale and the other part having a cooperating pointer to measure the magnitude of a manual pull applied to said handle when the first part is restrained, one of said pins being movable to enable said lever to be applied to the mooring line with one pin over and the other pin under the line so that said handle may be pulled manually in a direction such as to cause said pins to kink the line in the vertical plane of the line and lower the inflated part of the balloon until the portion of the line between said pins is substantially horizontal, said pins being sufficiently close together so that the lowering of the inflated part of the balloon due to such kinking does not materially alter the substantially horizontal location of the adjacent uninflated part of the balloon, and means carried by said lever for indicating that said portion of the line is substantially horizontal, the torque arm of said pull being substantially greater than the torque arm of said line about one of said pins as a fulcrum, and the ratio of the respective torque arms being predetermined, whereby, when said portion of the line is substantially horizontal, the lift of the inflated part of the balloon may be computed as substantially the product of the magnitude of the corresponding pull on said handle and said ratio.

9. In a mechanism for use with a mooring line connected at its upper end to a roller extending over the junction of the inflated upper part of a balloon and the substantially horizontally tethered uninflated gathered lower part of the balloon, for determining the lift of the inflated part, a lever having at one end a pair of spaced portions substantially farther from the other end of the lever than from each other, a spring balance comprising a part detachably connected to said lever at said other end and a relatively movable part having a handle, one of said balance parts having a scale and the other balance part having a cooperating pointer to measure the magnitude of a pull applied to said handle when the first balance part is restrained, said lever portions being positioned to straddle the mooring line with one lever portion over and the other lever portion under the line so that said handle may be pulled manually in a direction such as to cause said lever portions to kink the line in the vertical plane of the line and lower the inflated part of the balloon until the portion of the line between said lever portions is substantially horizontal, said lever portions being sufficiently close together so that the lowering of the inflated part of the balloon due to such kinking does not materially alter the substantially horizontal location of the adjacent uninflated part of the balloon, and means carried by said lever for indicating that said portion of the line is substantially horizontal, the torque arm of said pull when said line portion is substantially horizontal being substantially greater than the torque arm of the vertical component of the tension in said line about one of said lever portions as a fulcrum, and the ratio of the respective torque arms being predetermined, whereby, when said portion of the line is substantially horizontal, the lift of the inflated part of the balloon may be determined as substantially the product of the magnitude of the corresponding pull on said handle and said ratio.

10. In a mechanism for use with a mooring line connected at its upper end to a roller extending over the juncture of the inflated upper part of a balloon and the substantially horizontally tethered uninflated gathered lower part of the balloon, for determining the lift of the inflated part, a lever having a pair of spaced pins adapted to straddle the line with one pin over and the other pin under the line, a spring balance comprising a part connected to said lever remote from said pins and a relatively movable part having a handle, one of said balance parts having a scale and the other balance part having a cooperating pointer to measure the magnitude of manual pull applied to said handle in a direction such as to cause said pins to kink the line in the vertical plane of the line and lower the inflated part of the balloon until the portion of the line between said pins is substantially horizontal, said pins being sufficiently close together so that the lowering of the inflated part of the balloon due to such kinking does not materially alter the substantially horizontal location of the adjacent uninflated part of the balloon, the torque arm of said pull when said line portion is substantially horizontal being substantially greater than the torque arm of the vertical component of the tension in said line about one of said pins as a fulcrum, and the ratio of the respective torque arms being predetermined, whereby, when said portion of the line is horizontal, the lift of the inflated part of the balloon may be determined as substantially the product of the magnitude of the corresponding pull on said handle and said ratio.

11. In a mechanism for use in determining the vertical component of the tension in a line, a lever having a pair of spaced parts adapted to be positioned in contact with and respectively over and under an intermediate portion of the line, means enabling a progressively increasing force to be applied to a fixed point on said lever to cause said parts to progressively kink said line portion until said line portion extends substantially horizontal between said parts, one of said parts being disposed between said point and the other part, so that said lever will be supported solely by said force and the kinked line, means connected to said lever for measuring said force when said line portion is substantially horizontal, and means carried entirely by said lever for indicating that said line portion is substantially horizontal, the ratio of the torque arm of said force to the torque arm of said component when said portion is horizontal being predetermined, whereby said vertical component may be readily determined as substantially the product of the measured force and said ratio.

12. In a mechanism for use in determining the magnitude of the vertical component of the tension in a line, a lever having a pair of spaced parts between which the line may be positioned, means enabling turning force to be applied to said lever in a position to kink the line portion between said parts so that the lever is supported solely by said force and the kinked line, means for indicating that said line portion is horizontal, and means for indicating the value of the force when the line portion is horizontal, whereby the magnitude of said vertical component may be determined as substantially the product of said force and the ratio of the respective torque arms of said force and component about one of said parts as a fulcrum when the line portion is horizontal.

References Cited in the file of this patent

UNITED STATES PATENTS

| | | |
|---|---|---|
| 1,080,937 | Stephens | Dec. 9, 1913 |
| 2,013,938 | Williams | Sept. 10, 1935 |
| 2,538,932 | Campbell | Jan. 23, 1951 |
| 2,708,082 | Moore | May 10, 1955 |
| 2,743,606 | Webber | May 1, 1956 |

FOREIGN PATENTS

| | | |
|---|---|---|
| 2,135 | Great Britain | Dec. 8, 1900 |
| 575,227 | Germany | Apr. 26, 1933 |